US008017927B2

(12) United States Patent
Shakespeare et al.

(10) Patent No.: US 8,017,927 B2
(45) Date of Patent: Sep. 13, 2011

(54) APPARATUS, SYSTEM, AND METHOD FOR PRINT QUALITY MEASUREMENTS USING MULTIPLE ADJUSTABLE SENSORS

(75) Inventors: Tarja T. Shakespeare, Kuopio (FI); John F. Shakespeare, Kuopio (FI)

(73) Assignee: Honeywell International Inc., Morristown, NJ (US)

(*) Notice: Subject to any disclaimer, the term of this patent is extended or adjusted under 35 U.S.C. 154(b) by 1266 days.

(21) Appl. No.: 11/303,828

(22) Filed: Dec. 16, 2005

(65) Prior Publication Data

US 2007/0144388 A1 Jun. 28, 2007

(51) Int. Cl.
*G01N 21/86* (2006.01)
*G01N 21/84* (2006.01)
*B41J 29/393* (2006.01)

(52) U.S. Cl. ....................... 250/559.04; 356/429; 347/19

(58) Field of Classification Search ............. 250/559.04; 356/429; 347/19
See application file for complete search history.

(56) References Cited

U.S. PATENT DOCUMENTS 3,536,405 A 10/1970 Flower
3,802,774 A 4/1974 Eschler et al.
4,006,358 A 2/1977 Howarth
4,068,955 A 1/1978 Bodlaj
4,160,204 A 7/1979 Holmgren et al.
4,276,480 A 6/1981 Watson
4,288,691 A 9/1981 Horton
4,311,658 A 1/1982 Nicoll
4,376,946 A 3/1983 Kaminow et al.
4,439,038 A 3/1984 Mactaggart
4,488,808 A * 12/1984 Kato ................................ 356/73
4,490,845 A 12/1984 Steinbruegge et al.
4,505,550 A 3/1985 Steinbruegge
4,565,444 A 1/1986 Mactaggart
4,592,043 A 5/1986 Williams
4,634,928 A 1/1987 Figueroa et al.
4,653,925 A 3/1987 Thornton, Jr.

(Continued)

FOREIGN PATENT DOCUMENTS

DE 3148076 A1 6/1983

(Continued)

OTHER PUBLICATIONS

Tarja Shakespeare et al., "Problems in Colour Measurement of Fluorescent Paper Grades", Analytica Chimica Acta 380 (1999), pp. 227-242.

(Continued)

*Primary Examiner* — Thanh X Luu
(74) *Attorney, Agent, or Firm* — Munck Carter, LLP

(57) ABSTRACT

An apparatus includes at least one scanner. Each scanner includes a plurality of sensors, and each sensor is capable of measuring one or more characteristics associated with a portion of a substrate. The substrate has printing produced by a printing system. The apparatus also includes a controller capable of receiving at least some of the measurements from the plurality of sensors and determining a quality of the printing on the substrate using the received measurements. The substrate could represent paper, and the printing system could represent an offset printing system. At least one of the sensors may be in a fixed position and/or at least one of the sensors may be movable over part of a surface of the substrate. The determined quality of the printing could involve density, dot area, dot gain, contour sharpness, doubling, mottling, ghosting, misregister of different colored inks, slur, or improper positioning of the printing.

20 Claims, 4 Drawing Sheets

U.S. PATENT DOCUMENTS

| | | | |
|---|---|---|---|
| 4,699,510 A | 10/1987 | Alguard | |
| 4,708,483 A | 11/1987 | Lorenz | |
| 4,773,760 A | 9/1988 | Makkonen | |
| 4,786,817 A | 11/1988 | Boissevain et al. | |
| 4,797,246 A | 1/1989 | Reinke et al. | |
| 4,807,630 A | 2/1989 | Malinouskas | |
| 4,843,481 A | 6/1989 | Plummer | |
| 4,856,014 A | 8/1989 | Figueroa et al. | |
| 4,879,471 A | 11/1989 | Dahlquist | |
| 4,883,963 A | 11/1989 | Kemeny et al. | |
| 4,885,709 A | 12/1989 | Edgar et al. | |
| 4,928,013 A | 5/1990 | Howarth et al. | |
| 5,013,403 A | 5/1991 | Chase | |
| 5,015,099 A | 5/1991 | Nagai et al. | |
| 5,039,855 A | 8/1991 | Kemeny et al. | |
| 5,047,652 A | 9/1991 | Lisnyansky et al. | |
| 5,094,535 A | 3/1992 | Dahlquist et al. | |
| 5,122,974 A | 6/1992 | Chance | |
| 5,137,364 A | 8/1992 | McCarthy | |
| 5,166,748 A | 11/1992 | Dahlquist | |
| 5,172,005 A | 12/1992 | Cochran et al. | |
| 5,210,593 A | 5/1993 | Kramer | |
| 5,230,923 A | 7/1993 | Hirokawa et al. | |
| 5,235,192 A | 8/1993 | Chase et al. | |
| 5,276,327 A | 1/1994 | Bossen et al. | |
| 5,313,187 A | 5/1994 | Choi et al. | |
| 5,338,361 A | 8/1994 | Anderson et al. | |
| 5,365,084 A | 11/1994 | Cochran et al. | |
| 5,400,258 A | 3/1995 | He | |
| 5,438,406 A | 8/1995 | Puschell | |
| 5,444,528 A | 8/1995 | Puschell | |
| 5,471,309 A * | 11/1995 | Bolza-Schunemann | 356/394 |
| 5,492,601 A | 2/1996 | Ostermayer et al. | |
| 5,541,413 A | 7/1996 | Pearson et al. | |
| 5,581,353 A | 12/1996 | Taylor | |
| 5,598,266 A | 1/1997 | Cornuejols | |
| 5,606,173 A | 2/1997 | Concannon et al. | |
| 5,642,189 A | 6/1997 | Alguard | |
| 5,642,192 A | 6/1997 | Gordon et al. | |
| 5,694,214 A | 12/1997 | Watanabe et al. | |
| 5,696,591 A | 12/1997 | Bilhorn et al. | |
| 5,714,763 A | 2/1998 | Chase et al. | |
| 5,774,213 A | 6/1998 | Trebino et al. | |
| 5,793,486 A | 8/1998 | Gordon et al. | |
| 5,795,394 A | 8/1998 | Belotserkovsky et al. | |
| 5,821,536 A | 10/1998 | Pettit | |
| 5,891,306 A | 4/1999 | Chase et al. | |
| 5,933,243 A | 8/1999 | Hagen | |
| 5,963,333 A | 10/1999 | Walowit et al. | |
| 5,992,318 A | 11/1999 | DiBello et al. | |
| 6,031,233 A | 2/2000 | Levin et al. | |
| 6,038,028 A | 3/2000 | Grann et al. | |
| 6,058,201 A * | 5/2000 | Sikes et al. | 382/112 |
| 6,074,483 A | 6/2000 | Belotserkovsky et al. | |
| 6,100,986 A | 8/2000 | Rydningen | |
| 6,109,745 A * | 8/2000 | Wen | 347/101 |
| 6,111,649 A | 8/2000 | Tominaga et al. | |
| 6,262,419 B1 | 7/2001 | Huth-Fehre et al. | |
| 6,263,291 B1 | 7/2001 | Shakespeare et al. | |
| 6,272,440 B1 | 8/2001 | Shakespeare et al. | |
| 6,281,679 B1 | 8/2001 | King et al. | |
| 6,289,600 B1 | 9/2001 | Watts | |
| 6,297,879 B1 | 10/2001 | Yang et al. | |
| 6,327,374 B1 | 12/2001 | Piironen et al. | |
| 6,441,905 B1 | 8/2002 | Tojyo et al. | |
| 6,459,488 B1 | 10/2002 | Heffner | |
| 6,466,839 B1 | 10/2002 | Heaven et al. | |
| 6,476,920 B1 | 11/2002 | Scheiner et al. | |
| 6,494,446 B1 | 12/2002 | Tomiyama et al. | |
| 6,499,402 B1 | 12/2002 | Sikes et al. | |
| 6,515,746 B2 | 2/2003 | Opsal et al. | |
| 6,556,305 B1 | 4/2003 | Aziz et al. | |
| 6,556,306 B2 | 4/2003 | Jiang et al. | |
| 6,565,343 B1 | 5/2003 | Krycki | |
| 6,573,999 B1 | 6/2003 | Yang | |
| 6,584,435 B2 | 6/2003 | Mestha et al. | |
| 6,603,551 B2 | 8/2003 | Mestha et al. | |
| 6,639,201 B2 | 10/2003 | Almogy et al. | |
| 6,643,060 B2 | 11/2003 | Hashimoto et al. | |
| 6,646,752 B2 | 11/2003 | Chen et al. | |
| 6,690,357 B1 | 2/2004 | Dunton et al. | |
| 6,700,370 B2 | 3/2004 | Chen et al. | |
| 6,724,473 B2 | 4/2004 | Leong et al. | |
| 6,731,380 B2 | 5/2004 | Amara et al. | |
| 6,743,337 B1 | 6/2004 | Ischdonat | |
| 6,744,052 B1 | 6/2004 | Petersson et al. | |
| 6,757,069 B2 | 6/2004 | Bowles | |
| 6,760,103 B2 | 7/2004 | Shakespeare et al. | |
| 6,762,846 B1 | 7/2004 | Poris | |
| 6,763,322 B2 | 7/2004 | Potyrailo et al. | |
| 6,780,284 B2 | 8/2004 | Almi et al. | |
| 6,793,854 B1 | 9/2004 | Kirjavainen | |
| 6,805,899 B2 | 10/2004 | MacHattie et al. | |
| 6,816,636 B2 | 11/2004 | Cole et al. | |
| 6,822,785 B1 | 11/2004 | Chu et al. | |
| 6,849,844 B2 | 2/2005 | Khoury | |
| 6,856,436 B2 | 2/2005 | Brukilacchio et al. | |
| 6,949,734 B2 | 9/2005 | Neff et al. | |
| 7,259,853 B2 | 8/2007 | Hubble, III et al. | |
| 7,291,856 B2 | 11/2007 | Haran et al. | |
| 7,369,240 B1 | 5/2008 | Abbott et al. | |
| 7,688,447 B2 | 3/2010 | Shakespeare et al. | |
| 2002/0030711 A1* | 3/2002 | Minckler | 347/19 |
| 2002/0051073 A1* | 5/2002 | Paavola et al. | 348/373 |
| 2002/0167669 A1* | 11/2002 | Schwarz | 356/446 |
| 2003/0007161 A1 | 1/2003 | Bowles | |
| 2003/0058441 A1 | 3/2003 | Shakespeare et al. | |
| 2004/0119781 A1 | 6/2004 | Szumla | |
| 2004/0124366 A1 | 7/2004 | Zeng et al. | |
| 2004/0212804 A1 | 10/2004 | Neff et al. | |
| 2004/0246493 A1 | 12/2004 | Kim et al. | |
| 2004/0260520 A1 | 12/2004 | Braendle et al. | |
| 2005/0065400 A1 | 3/2005 | Banik et al. | |
| 2005/0187478 A1 | 8/2005 | Beaudry et al. | |
| 2005/0213822 A1* | 9/2005 | Stober | 382/201 |
| 2005/0236481 A1 | 10/2005 | Gascoyne et al. | |
| 2006/0001925 A1* | 1/2006 | Tatarczyk | 358/509 |
| 2006/0028156 A1 | 2/2006 | Jungwirth | |
| 2006/0132777 A1 | 6/2006 | Hubble, III et al. | |
| 2006/0132796 A1 | 6/2006 | Haran | |
| 2006/0132808 A1 | 6/2006 | Jasinski et al. | |
| 2006/0164643 A1 | 7/2006 | Giakos | |
| 2006/0243931 A1 | 11/2006 | Haran et al. | |
| 2007/0139735 A1 | 6/2007 | Shakespeare et al. | |
| 2007/0144388 A1 | 6/2007 | Shakespeare et al. | |
| 2007/0153278 A1 | 7/2007 | Shakespeare et al. | |
| 2008/0157013 A1 | 7/2008 | Shakespeare | |

FOREIGN PATENT DOCUMENTS

| | | | |
|---|---|---|---|
| DE | 19515499 | A1 | 10/1996 |
| DE | 100 31 636 | A1 | 1/2002 |
| EP | 0 319 158 | A1 | 6/1989 |
| EP | 0 843 155 | A1 | 5/1998 |
| EP | 1437222 | A1 | 7/2004 |
| EP | 1457335 | A1 | 9/2004 |
| EP | 1 491 877 | A1 | 12/2004 |
| WO | WO 87/07381 | A1 | 12/1987 |
| WO | WO 97/08537 | A1 | 3/1997 |
| WO | WO 99/02941 | A1 | 1/1999 |
| WO | WO 00/31521 | A1 | 6/2000 |
| WO | WO 03/037111 | A1 | 5/2003 |
| WO | WO 2006/116672 | A2 | 11/2006 |

OTHER PUBLICATIONS

Tarja Shakespeare et al., "Advanced Colour Control Through Reflectance Optimization", Proceedings 2nd EcoPaperTech Conference, Helsinki Finland, Jun. 1998, pp. 183-194.

Stokman et al., "Color Measurement by Imaging Spectrometry", Computer Vision & Image Understanding, San Diego, CA, US, vol. 79, No. 2, Aug. 2000, pp. 236-249.

Wandell, "Color Measurement and Discrimination", Journal of the Optical Society of America, USA, vol. 2, No. 1, Jan. 1985, pp. 62-71.

* cited by examiner

APPARATUS, SYSTEM, AND METHOD FOR PRINT QUALITY MEASUREMENTS USING MULTIPLE ADJUSTABLE SENSORS

TECHNICAL FIELD

This disclosure relates generally to printing systems and more specifically to an apparatus, system, and method for print quality measurements.

BACKGROUND

Different types of printing systems are available and used to print newspapers, books, and other documents. These conventional printing systems often include components such as in-line presses, common-impression-cylinder presses, and blanket-to-blanket presses. Some conventional printing systems are used to produce printing on large streams of paper, such as paper that is three meters wide. Some conventional printing systems are also used to produce printing on quickly moving paper, such as paper that is moving at twenty meters per second. Some conventional printing systems also incorporate multiple printing steps, such as systems that support the sequential application of inks of different colors or appearance, laquers or other surface sealants, and so forth.

It is often necessary to monitor the quality of the printing provided by a conventional printing system. As an example, it is often desirable to monitor the quality of the printing on newspapers to ensure that the conventional printing system is operating properly. This may also allow problems with the conventional printing system to be detected and resolved. However, conventional print quality monitoring techniques typically suffer from various problems. For example, conventional print quality monitoring techniques are often slow and expensive. Also, there is often a small or limited amount of space in which a print quality monitoring instrument can be installed and used. This typically limits the functionality that can be provided by the instrument.

SUMMARY

This disclosure provides an apparatus, system, and method for print quality measurements.

In a first embodiment, an apparatus includes at least one scanner. Each scanner includes a plurality of sensors, and each sensor is capable of measuring one or more characteristics associated with a portion of a substrate. The substrate has printing produced by a printing system. The apparatus also includes a controller capable of receiving at least some of the measurements from the plurality of sensors and determining a quality of the printing on the substrate using the received measurements.

In particular embodiments, the substrate represents paper, and the printing system represents an offset printing system.

In other particular embodiments, at least one of the sensors is in a fixed position and/or at least one of the sensors is movable over part of a surface of the substrate.

In yet other particular embodiments, the determined quality of the printing involves one or more of density, dot area, dot gain, contour sharpness, doubling, mottling, ghosting, slur, improper positioning of the printing, and misregister of different colored inks.

In a second embodiment, a system includes a printing system capable of producing printing on a substrate. The system also includes a print quality monitor having at least one scanner. Each scanner includes a plurality of sensors, and each sensor is capable of measuring one or more characteristics associated with a portion of the substrate. In addition, the system includes a controller capable of receiving at least some of the measurements from the plurality of sensors and determining a quality of the printing on the substrate using the received measurements.

In a third embodiment, a method includes measuring one or more characteristics associated with a portion of a substrate using at least one scanner. Each scanner has a plurality of sensors, and the substrate has printing produced by a printing system. The method also includes determining a quality of the printing on the substrate using at least some of the measurements from the plurality of sensors.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
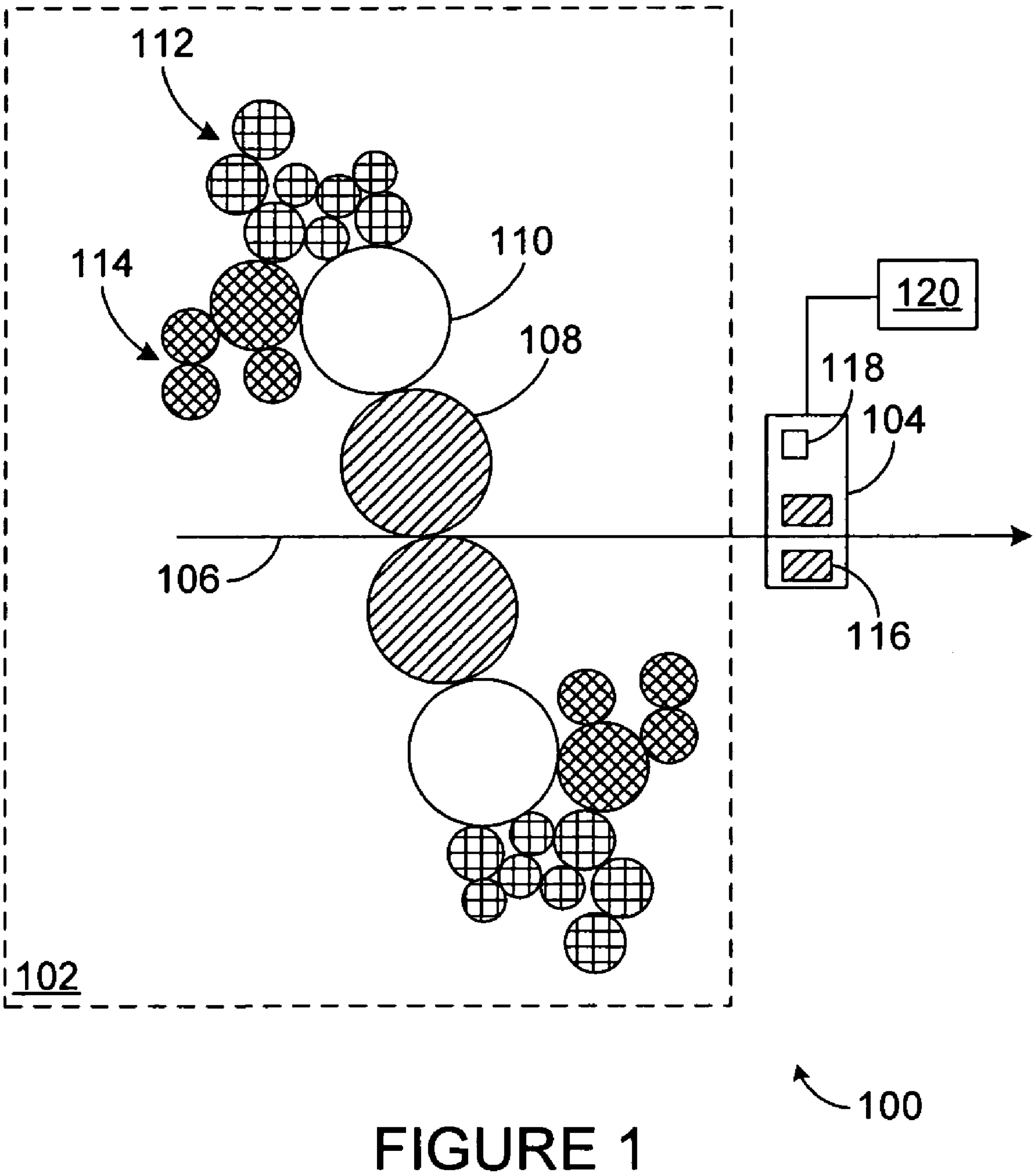
FIG. 1 illustrates an example system for print quality measurements according to one embodiment of this disclosure.

FIG. 1 illustrates an example system 100 for print quality measurements according to one embodiment of this disclosure. The embodiment of the system 100 shown in FIG. 1 is for illustration only. Other embodiments of the system 100 could be used without departing from the scope of this disclosure.

In this example, the system 100 includes a printing press 102 and a print quality monitor 104. The printing press 102 is capable of printing content (such as text and images) on a substrate 106 (such as paper). In particular embodiments, the substrate 106 could represent paper or other material that is approximately three meters wide and that moves through the printing press 102 at up to twenty meters per second or more.

In this particular example, the printing press 102 represents a blanket-to-blanket press that includes two blanket cylinders 108, two plate cylinders 110, two inking units 112, and two dampening units 114. The blanket cylinders 108 are capable of creating the actual printing on the substrate 106. For example, a rubber blanket or other type of blanket may be mounted on each blanket cylinder 108, and ink may be transferred onto the blanket and then onto the substrate 106. The plate cylinders 110 may include printing plates, which receive ink and then transfer the ink onto the blankets mounted on the blanket cylinders 108. In this way, the plate cylinders 110 control what is actually printed on the substrate 106. The inking units 112 are responsible for transferring the ink onto the plate cylinders 110. The dampening units 114 are capable of using dampening fluid to dampen the plate cylinders 110, which helps to facilitate the transfer of ink onto the blankets mounted on the blanket cylinders 108.

This represents a brief description of one type of printing press 102 that may be used in the system 100. Additional details regarding this type of printing press 102 are well-known in the art and are not needed for an understanding of this disclosure. Also, this represents one specific type of printing press 102 that may be used in the system 100. The system 100 could include any other or additional types of printing presses. For example, the system 100 could include other offset printing or lithography systems (including sheet-fed offset printing presses), Gravure printing systems, letterpresses, and screen printing systems. In addition, the printing press 102 could be capable of printing content on any suitable substrate 106, such as paper, plastic, textiles, metal foil or sheets, or other or additional substrates.

The print quality monitor 104 is capable of scanning the substrate 106 after the printing press 102 has created the printing on the substrate 106. The print quality monitor 104 measures various characteristics about the substrate 106 itself and/or the printing on the substrate 106. In this way, the print quality monitor 104 can determine the quality of the printing produced by the printing press 102. This may allow the print quality monitor 104 to ensure that the printing press 102 is operating properly and to identify potential problems with the printing press 102.

In this example, the print quality monitor 104 includes one or more scanners 116. Each scanner 116 includes multiple sensors that are capable of scanning the substrate 106 and taking measurements used to determine the quality of the printing provided by the printing press 102. Also, each sensor in the scanners 116 may be responsible for scanning only a portion of the substrate 106 rather than the entire width of the substrate 106. Each scanner 116 includes any suitable structure or structures for measuring one or more characteristics about the substrate 106 itself and/or the printing on the substrate 106. As particular examples, each scanner 116 could represent a mini-scanner having one or more cameras, microscopes, densitometers, colorimetric sensors, or other or additional types of sensors. Also, each sensor in a scanner 116 could be fixed or movable. In other embodiments, an additional scanner may be used to scan the substrate 106 prior to the printing process so that its sensors measure the properties of the unprinted substrate 106.

As shown in FIG. 1, the print quality monitor 104 may also include a controller 118. The controller 118 could use the measurements from the scanners 116 to determine the quality of the printing on the substrate 106. For example, the controller 118 could use the measurements to determine if the density (ability of material to absorb light), dot area (percentage of area occupied by dots), and dot gain (change in size of dot from plate cylinder 110 to substrate 106) of the printing is within acceptable levels. The controller 118 could also use the measurements to determine if the printing is suffering from doubling (faint image offset from primary image), mottling (spotty or cloudy appearance of ink on substrate 106), ghosting (image elements overlap onto subsequent image areas), ink misregister (lateral and/or longitudinal misalignment between inks applied at sequential presses), or slur (round dots appear as elliptical dots). In addition, the controller 118 could use the measurements to ensure that the printing is properly positioned on the substrate 106, such as by using register marks on the substrate 106 that are detected by the scanners 116. The controller 118 could use the measurements to make any other or additional determinations. In other embodiments, the controller 118 could collect the measurements from the scanners 116 and provide the measurements to an external controller 120, which makes print quality determinations using the measurements. In yet other embodiments, the measurements from the scanners 116 could be provided directly to the external controller 120 without the use of a controller 118. Each of the controllers 118, 120 includes any suitable hardware, software, firmware, or combination thereof for making print quality determinations using measurements from one or more scanners 116.

Additional details regarding the scanners 116 are shown in FIGS. 2A through 2E, which are described below. Also, example configurations of the print quality monitor 104 with respect to the printing press 102 are shown in FIGS. 3A through 3C, which are described below.

Although FIG. 1 illustrates one example of a system 100 for print quality measurements, various changes may be made to FIG. 1. For example, as noted above, other or additional types of printing presses could be used in the system 100. Also, while shown as including two scanners 116, the print quality monitor 104 could include a single scanner 116 or more than two scanners 116. In addition, the system 100 could include any number of printing presses 102 and any number of print quality monitors 104.

Figure 2A:
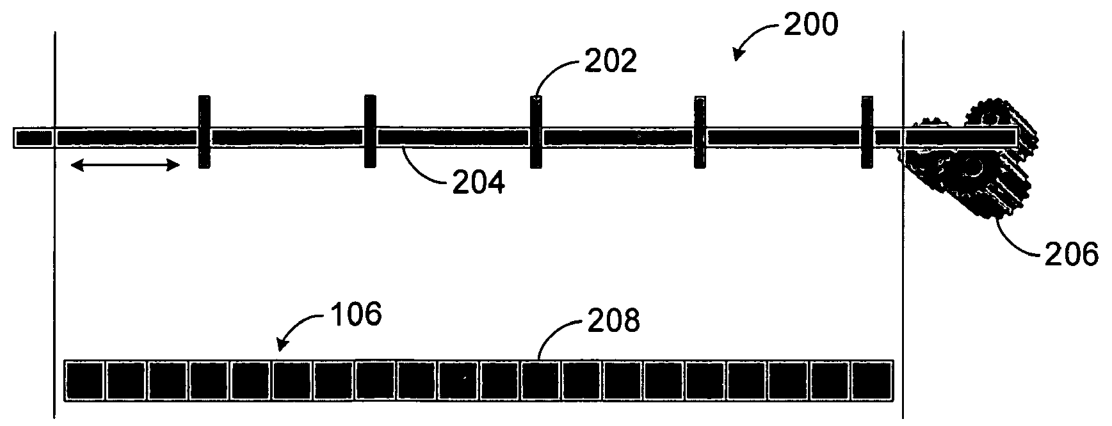
FIGS. 2A through 2E illustrate details of example scanners in a system for print quality measurements according to one embodiment of this disclosure.
Figure 2B:
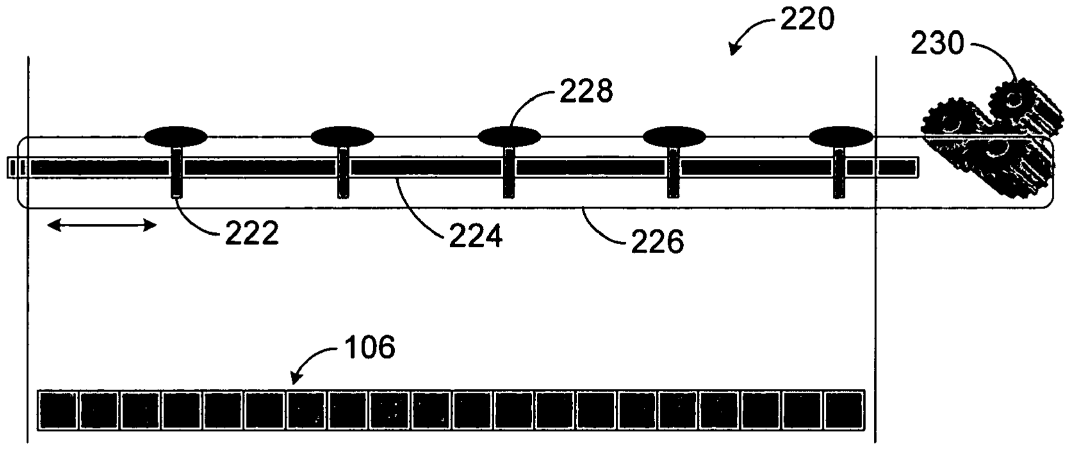
Figure 2C:
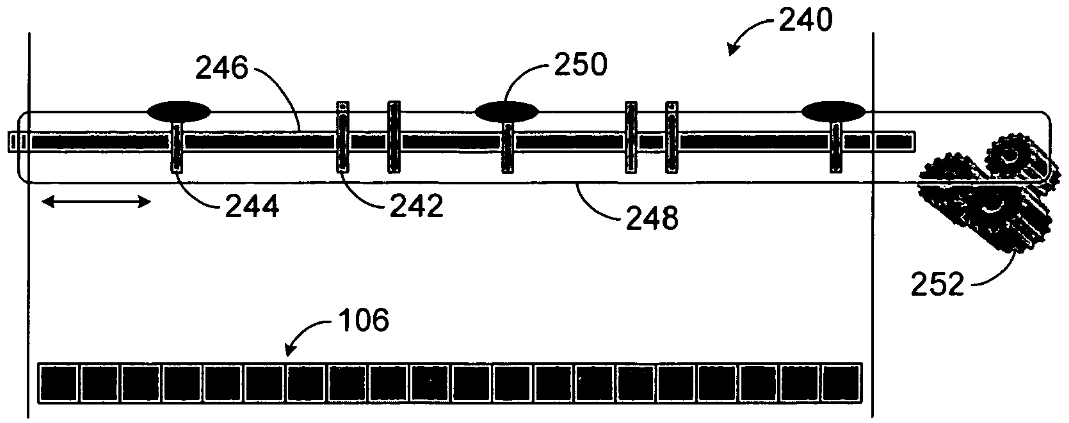
Figure 2D:
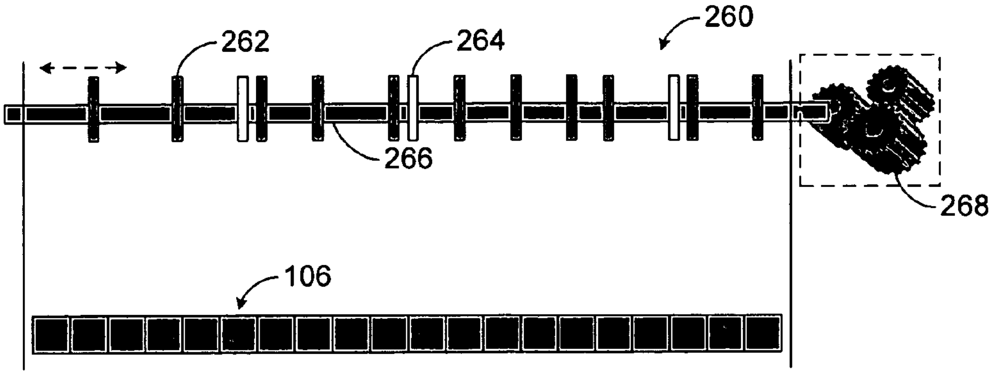
Figure 2E:
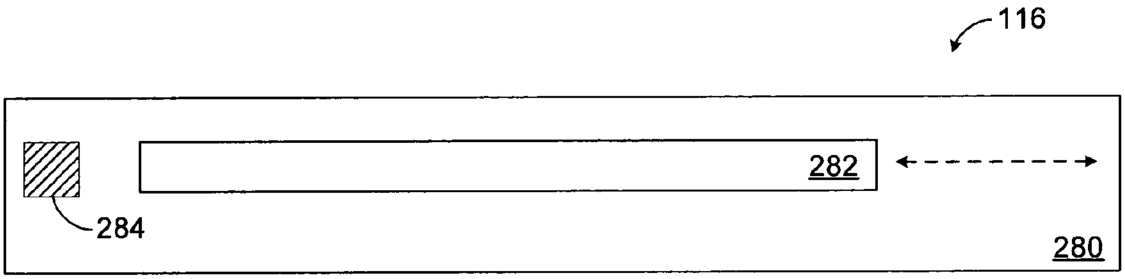
Figure 3A:
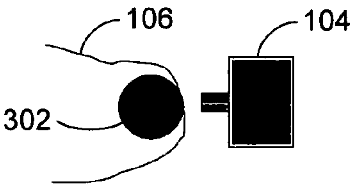
FIGS. 3A through 3C illustrate example configurations of print quality monitors in a system for print quality measurements according to one embodiment of this disclosure.
Figure 3B:
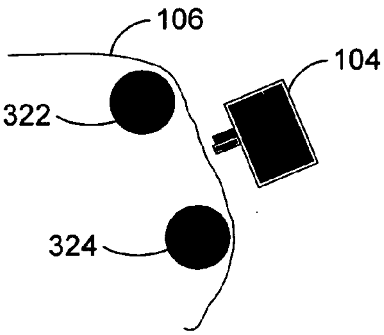
Figure 3C:
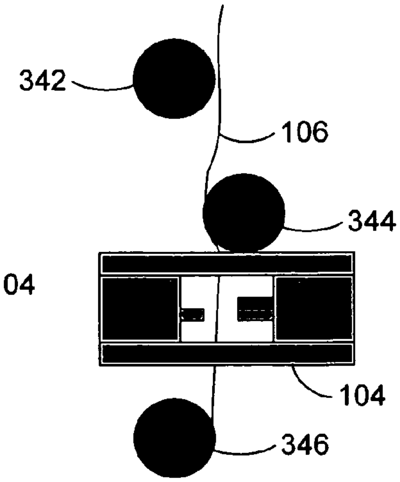

FIGS. 2A through 2E illustrate details of example scanners in a system for print quality measurements according to one embodiment of this disclosure. In particular, FIGS. 2A through 2D illustrate example sensor arrays for use in a scanner 116, and FIG. 2E illustrates a housing of a scanner 116. The embodiments of the sensor arrays and housing shown in FIGS. 2A through 2E are for illustration only. Other scanners having other sensor arrays or housings may be used without departing from the scope of this disclosure. Also, for ease of explanation, the sensor arrays and housing shown in FIGS. 2A through 2E are described with respect to the system 100 of FIG. 1. The sensor arrays and housing could be used in a scanner in any other suitable system.

In FIG. 2A, a sensor array 200 in a scanner 116 includes multiple sensors 202 mounted on a movable frame 204. Each of the sensors 202 measures one or more characteristics of the substrate 106 or the printing on the substrate 106. For example, the sensors 202 could measure the density, dot area, or dot gain (physical or optical) of the printing. The sensors 202 could also measure doubling, mottling, ghosting, misregister of different colored inks, and slur of the printing. Further, the sensors 202 could identify register marks or control strips on the substrate 106 itself or the sharpness of contours in the printing. In addition, the sensors 202 could be used to measure characteristics of areas of known interest on the substrate 106 (such as areas known or expected to contain company or product logos or images of people's faces). Each sensor 202 represents any suitable structure or structures for measuring one or more characteristics of the substrate 106 or the printing on the substrate 106. As examples, the sensors 202 could include densitometers, spectrophotometers, camera-based calorimeters, filter-based calorimeters, and camera-based microscopes. In the illustrated example, the sensors 202 are evenly spaced on the frame 204, although the sensors 202 may have any other suitable spacing.

The movable frame 204 is attached to a frame carrier 206, which is capable of moving the frame 204 back and forth across a surface of the substrate 106. For example, the substrate 106 could be divided into multiple zones 208, and the frame carrier 206 could move the frame 204 back and forth so that each sensor 202 passes over multiple zones 208. In particular embodiments, each zone 208 is 1.25 inches wide, and the frame carrier 206 moves the frame 204 so that each sensor 202 passes over four zones 208. The frame carrier 206 includes any suitable structure or structures for moving the frame 204 over the substrate 106. The frame carrier 206 could, for example, represent a structure or structures for moving the frame 204 in a direction perpendicular to the direction of movement for the substrate 106.

FIG. 2B illustrates another sensor array 220, which uses a different movement mechanism than that shown in FIG. 2A. In this example, the sensor array 220 includes multiple sensors 222 that are slidably mounted on a fixed frame 224. The sensors 222 are attached to a guide 226, such as a belt or a wire. The sensors 222 may be attached to the guide 226 in any suitable manner, such as by using sledges 228. Movement of the guide 226 is controlled by a guide mover 230. The guide mover 230 is capable of causing the guide 226 to rotate back and forth, which causes each sensor 222 to move back and forth across a surface of the substrate 106. By moving the sensors 222 with a guide 226 instead of moving the frame 224, the frame 224 in FIG. 2B could be shorter than the frame 204 in FIG. 2A.

In FIG. 2C, a sensor array 240 includes a combination of fixably mounted sensors 242 and slidably mounted sensors 244 on a fixed frame 246. In this example, only the movable sensors 244 are attached to a guide 248 by sledges 250. As a result, only the movable sensors 244 move back and forth across a surface of the substrate 106 under the control of a guide mover 252. The fixed sensors 242 remain in place over the substrate 106.

In FIG. 2D, a sensor array 260 includes sensors 262-264 mounted on a frame 266 at an uneven or unequal spacing. In this example, the sensors 262-264 could represent different types of sensors. As a particular example, the sensors 262 could represent camera-based densitometers or other densitometers, and the sensors 264 could represent camera-based or other register and microscope sensors. As shown in FIG. 2D, the frame 266 may or may not be moved back and forth over the substrate 106 by a frame carrier 268. Movement of the sensors 262-264 may not be needed, for example, if the sensors 262-264 are close enough to accurately monitor the quality of the printing.

In some embodiments, the locations of the sensors in the sensor arrays of FIGS. 2A through 2D can be adjusted manually or automatically to achieve optimal measurements for a particular print run. For example, to verify that skin tone colors are correct, a colorimetric sensor could be manually or automatically positioned so that it is able to scan a printed image of a face on the substrate 106.

FIG. 2E illustrates a housing 280 for a scanner 116. In this example, the housing 280 includes a sensor array 282, which may represent any of the sensor arrays shown in FIGS. 2A through 2D, any other sensor array, or any combination of sensor arrays. While shown as being movable, the sensor array 282 could be fixed in the housing 280. Also, the sensor array 282 could have any suitable size, and the size of the sensor array 282 may depend at least partially on whether the sensor array 282 is fixed or movable.

The housing 280 also includes one or more calibration tiles 284. The calibration tiles 284 may represent one or more tiles or other structures having one or more known or standard colors. The calibration tiles 284 may be positioned so that one or more colorimetric sensors in the sensor array 282 pass over the calibration tiles 284 during a calibration of the scanner 116. In this way, the sensors or other components may be calibrated to ensure that proper measurements of the substrate 116 are made during normal operation of the scanner 116. The calibration tiles 284 may be positioned in the housing 280 so that they do not interfere with normal operation and scanning of the substrate 106.

Although FIGS. 2A through 2E illustrate example details of a scanner 116 in a system for print quality measurements, various changes may be made to FIGS. 2A through 2E. For example, FIGS. 2A through 2C illustrate the use of a single type of sensor, while FIG. 2D illustrates the use of multiple types of sensors. Each sensor array shown in FIGS. 2A through 2D could include one or multiple types of sensors. Also, the number and spacing of the sensors in FIGS. 2A through 2D are for illustration only. Each sensor array could include any suitable number of sensors having any suitable spacing. The number of sensors could, for example, depend on the maximum width of the substrate 106 and the desired spacing between the sensors. In addition, the sensor arrays of FIGS. 2A through 2D could be used with any other suitable housing, and the housing of FIG. 2E could be used with any other suitable sensor arrays.

FIGS. 3A through 3C illustrate example configurations of print quality monitors 104 in a system for print quality measurements according to one embodiment of this disclosure. The configurations of the print quality monitors 104 shown in FIGS. 3A through 3C are for illustration only. Other configurations may be used without departing from the scope of this disclosure. Also, for ease of explanation, the configurations shown in FIGS. 3A through 3C are described with respect to the system 100 of FIG. 1. The configurations could be used in any other suitable system.

FIG. 3A illustrates the use of a one-sided print quality monitor 104 in a position where a substrate 106 is supported by a cylinder 302. Because the substrate 106 is supported by the cylinder 302, this may simplify the scanning of the substrate 106 and the measuring of print quality on the substrate 106. This is because the substrate 106 typically cannot move closer to and farther away from the print quality monitor 104 during scanning. While FIG. 3A shows the substrate 106 as being supported by a cylinder 302, the substrate 106 could be supported in other ways. For instance, guide bars or plates may be used to constrain the position of the substrate 106 instead of or in addition to the use of cylinders.

FIG. 3B illustrates the use of a one-sided print quality monitor 104 in a position where the substrate 106 is not supported by any cylinders 322-324. Rather, in this example, the substrate 106 is scanned in a location between the two cylinders 322-324. As a result, it is possible that the substrate 106 may flutter or move during the scanning of the substrate 106. Similarly, FIG. 3C illustrates the use of a two-sided print quality monitor 104 in a position where the substrate 106 is not supported by any cylinders 342-346. In this example, the substrate 106 is scanned in a location between the cylinders 344-346. Again, it is possible that the substrate 106 may move during the scanning of the substrate 106. In these embodiments, the print quality monitor 104 could include or otherwise operate in conjunction with optics or other mechanisms that allow the print quality monitor 104 to accurately scan the fluttering substrate 106.

The print quality monitors 104 could be positioned in any suitable location or locations and scan the substrate 106 after any suitable operation or operations in the system 100. For example, a print quality monitor 104 could scan the substrate 106 after inks (such as yellow, magenta, cyan, and black inks) have been applied to the substrate 106. A print quality monitor 104 could also scan the substrate 106 after drying of the ink or after lacquering of the substrate 106. In some embodiments, the use of a two-sided print quality monitor 104 as shown in FIG. 3C may require that an open draw of substrate 106 be located in the system 100.

Although FIGS. 3A through 3C illustrate examples of configurations of print quality monitors 104 in a system for print quality measurements, various changes may be made to FIGS. 3A through 3C. For example, a system could use one, some, or all of the configurations shown in FIGS. 3A through 3C.

Figure 4:
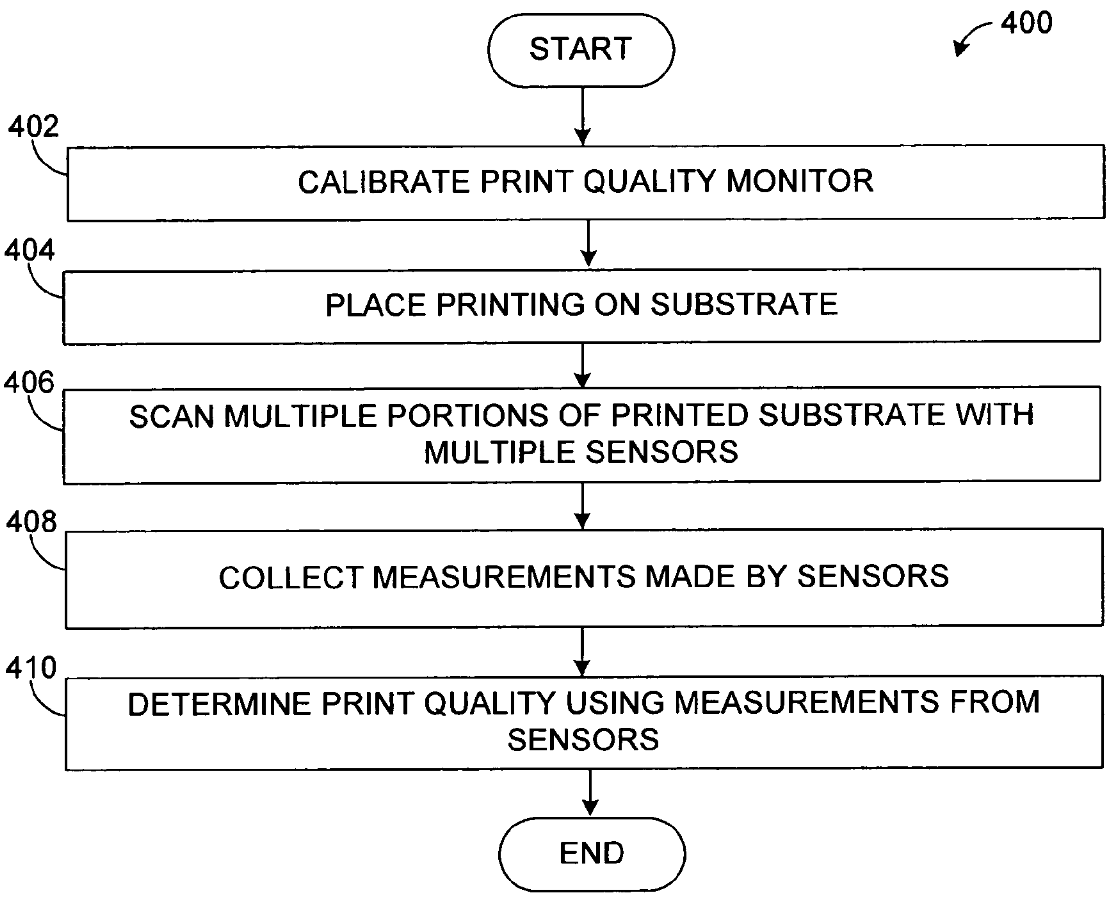
FIG. 4 illustrates an example method for print quality measurements according to one embodiment of this disclosure.

FIG. 4 illustrates an example method 400 for print quality measurements according to one embodiment of this disclosure. For ease of explanation, the method 400 is described with respect to the system 100 of FIG. 1. The method 400 could be used by any suitable device and in any suitable system.

The system 100 calibrates a print quality monitor 104 at step 402. This may include, for example, the print quality monitor 104 moving a sensor over a calibration tile 284. This may also include the print quality monitor 104 using colorimetric measurements from the sensor to calibrate the print quality monitor 104.

The system 100 places printing on a substrate 106 at step 404. This may include, for example, the printing press 102 placing inks onto paper or another substrate 106. The printing press 102 could print text, images, and any other or additional content onto the substrate 106.

The system 100 scans multiple portions of the printed substrate 106 with multiple sensors at step 406. This may include, for example, the print quality monitor 104 scanning the substrate 106 with sensors mounted on a movable or fixed frame. This may also include the print quality monitor 104 moving at least some of the sensors back and forth over the substrate 106. As particular examples, this may include the sensors in the print quality monitor 104 measuring density, dot area, dot gain, doubling, mottling, ghosting, ink misregister, or slur of the printing. This may also include the sensors in the print quality monitor 104 identifying register marks or control strips on the substrate 106.

The system 100 collects the measurements from the sensors at step 408. This may include, for example, the controller 118 or the external controller 120 receiving data representing the various measurements made by the sensors in the print quality monitor 104.

The system 100 determines the quality of the printing on the substrate 106 using at least some of the measurements from the sensors at step 410. This may include, for example, the controller 118 or the external controller 120 determining whether the density, dot area, or dot gain of the printing is within acceptable limits. This may also include the controller 118 or the external controller 120 determining whether the printing is suffering from doubling, mottling, ghosting, ink misregister, or slur. This may further include the controller 118 or the external controller 120 determining whether the printing is occurring in the proper areas of the substrate 106. In addition, this may include the controller 118 or the external controller 120 determining the sharpness of contours in the printing, the physical size of pixels in the printing, and other properties of the printed pixels.

Although FIG. 4 illustrates one example of a method 400 for print quality measurements, various changes may be made to FIG. 4. For example, while shown as a series of steps, various steps in FIG. 4 could occur in parallel or in a different order. Also, in determining the quality of the printing on the substrate 106, the method 100 could also use measurements of properties of the unprinted substrate 106 made prior to printing or properties of unprinted portions of the substrate 106 after printing.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. For example, there are many advantageous combinations of this disclosure with other systems. As particular examples, measurements of print quality may be supplied to a print quality control system, which can adjust parameters of the printing process to achieve an acceptable level of print quality. The print quality control system could, for instance, adjust ink fountain keys, moistening devices, tensioning devices, or lateral and rotational offsets of printing cylinders. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:

a scanner comprising a plurality of sensors, each sensor configured to measure one or more characteristics associated with a different portion of a substrate, the substrate having printing produced by a printing system, wherein a location of at least one of the sensors is adjustable in relation to at least one other of the sensors to achieve optimal measurements for a particular printing; and a controller configured to receive at least some of the measurements from the plurality of sensors and to determine a quality of the printing on the substrate using the received measurements;

wherein at least a first of the sensors is slidably mounted on a frame and attached to a guide, and at least a second of the sensors is fixably mounted on the frame; and wherein the apparatus further comprises a guide mover configured to move the guide so as to move at least the first sensor across part of a surface of the substrate.

2. The apparatus of claim 1, wherein multiple ones of the sensors are mounted on the frame at an uneven spacing.

3. The apparatus of claim 1, wherein the plurality of sensors comprises a plurality of densitometers and at least one of a camera and a microscope.

4. The apparatus of claim 3, wherein the controller is configured to determine the quality of the printing by one or more of:

determining if the printing is suffering from at least one of: doubling, mottling, ghosting, misregister of different colored inks, and slur; and determining if the printing is located in an acceptable position on the substrate.

5. The apparatus of claim 1, wherein the apparatus comprises a plurality of scanners, each scanner associated with a different side of the substrate.

6. The apparatus of claim 1, wherein:

the printing system comprises an offset printing system; and the substrate comprises paper.

7. An apparatus, comprising:

a scanner comprising a plurality of sensors arranged in a substantially linear row, each sensor configured to measure one or more characteristics associated with a different portion of a substrate, the substrate having printing produced by a printing system, wherein a location of at least some of the sensors is adjustable in relation to other sensors to achieve optimal measurements for a particular printing; and a controller configured to receive at least some of the measurements from the plurality of sensors and to determine a quality of the printing on the substrate using the received measurements;

wherein the scanner further comprises at least one calibration tile disposed in a housing of the scanner, the at least one calibration tile having a known color, the at least one calibration tile used to calibrate one or more of the sensors.

8. The apparatus of claim 7, wherein multiple ones of the sensors are mounted on a frame at an uneven spacing.

9. The apparatus of claim 7, wherein:

at least a first of the sensors is slidably mounted on a frame and attached to a guide, and at least a second of the sensors is fixably mounted on the frame; and the apparatus further comprises a guide mover configured to move the guide so as to move at least the first sensor across part of a surface of the substrate.

10. The apparatus of claim 7, wherein the controller is configured to determine the quality of the printing by one or more of:

determining if at least one of a density, a dot area, a dot gain, and a sharpness of contours of the printing is acceptable;

determining if the printing is suffering from at least one of: doubling, mottling, ghosting, misregister of different colored inks, and slur; and determining if the printing is located in an acceptable position on the substrate.

11. A system, comprising:

a printing system configured to produce printing on a substrate;

a print quality monitor comprising a scanner, the scanner comprising a plurality of sensors, each sensor configured to measure one or more characteristics associated with a different portion of the substrate, wherein a location of at least one of the sensors is adjustable in relation to at least one other of the sensors to achieve optimal measurements for a particular printing; and a controller configured to receive at least some of the measurements from the plurality of sensors and to determine a quality of the printing on the substrate using the received measurements;

wherein at least a first of the sensors is slidably mounted on a frame and attached to a guide, and at least a second of the sensors is fixably mounted on the frame; and wherein the apparatus further comprises a guide mover configured to move the guide so as to move at least the first sensor across part of a surface of the substrate.

12. The system of claim 11, wherein the plurality of sensors comprises one or more of: a densitometer, a spectrophotometer, a colorimeter, a camera, and a microscope.

13. The system of claim 12, wherein the controller is configured to determine the quality of the printing by one or more of:

determining if at least one of a density, a dot area, a dot gain, and a sharpness of contours of the printing is acceptable;

determining if the printing is suffering from at least one of: doubling, mottling, ghosting, misregister of different colored inks, and slur; and determining if the printing is located in an acceptable position on the substrate.

14. The system of claim 11, wherein the controller comprises one of:

a controller residing in the print quality monitor; and a controller residing external to the print quality monitor.

15. A system, comprising:

a printing system configured to produce printing on a substrate;

a print quality monitor comprising a scanner, the scanner comprising a plurality of sensors arranged in a substantially linear row, each sensor configured to measure one or more characteristics associated with a different portion of the substrate, wherein a location of at least one of the sensors is adjustable in relation to at least one other of the sensors to achieve optimal measurements for a particular printing; and a controller configured to receive at least some of the measurements from the plurality of sensors and to determine a quality of the printing on the substrate using the received measurements;

wherein the scanner further comprises at least one calibration tile disposed in a housing of the scanner, the at least one calibration tile having a known color, the at least one calibration tile used to calibrate one or more of the sensors.

16. The system of claim 15, wherein:

at least a first of the sensors is slidably mounted on a frame and attached to a guide, and at least a second of the sensors is fixably mounted on the frame; and the print quality monitor further comprises a guide mover configured to move the guide so as to move at least the first sensor across part of a surface of the substrate.

17. The system of claim 15, wherein the controller is configured to determine the quality of the printing by one or more of:

determining if at least one of a density, a dot area, a dot gain, and a sharpness of contours of the printing is acceptable;

determining if the printing is suffering from at least one of: doubling, mottling, ghosting, misregister of different colored inks, and slur; and determining if the printing is located in an acceptable position on the substrate.

18. A method, comprising:

measuring one or more characteristics associated with portions of a substrate using a scanner, the scanner comprising a plurality of sensors, each sensor associated with a different portion of the substrate, the substrate having printing produced by a printing system;

adjusting a location of at least one of the sensors in relation to at least one other of the sensors to achieve optimal measurements for a particular printing; and determining a quality of the printing on the substrate using at least some of the measurements from the plurality of sensors;

wherein at least a first of the sensors is slidably mounted on a frame and attached to a guide, and at least a second of the sensors is fixably mounted on the frame; and wherein adjusting the location of at least one of the sensors comprises moving the guide so as to move at least the first sensor across part of a surface of the substrate.

19. The method of claim 18, wherein:

measuring the one or more characteristics comprises measuring the one or more characteristics using one or more of: a densitometer, a spectrophotometer, a colorimeter, a camera, and a microscope; and determining the quality of the printing comprises one or more of:

determining if at least one of a density, a dot area, a dot gain, and a sharpness of contours of the printing is acceptable;

determining if the printing is suffering from at least one of: doubling, mottling, ghosting, misregister of different colored inks, and slur; and determining if the printing is located in an acceptable position on the substrate.

20. The method of claim 18, wherein:

the scanner further comprises at least one calibration tile disposed in a housing of the scanner, the at least one calibration tile having a known color; and the method further comprises using the at least one calibration tile to calibrate one or more of the sensors.

* * * * *